(12) United States Patent
Seitz et al.

(10) Patent No.: US 11,041,101 B2
(45) Date of Patent: Jun. 22, 2021

(54) CONDENSATION-CURABLE ELECTRICALLY CONDUCTIVE SILICONE ADHESIVE COMPOSITION

(71) Applicant: Dow Silicones Corporation, Midland, MI (US)

(72) Inventors: Aaron J Seitz, Midland, MI (US); Joseph R Sootsman, Freeland, MI (US); Adriana P Zambova, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 227 days.

(21) Appl. No.: 16/346,302

(22) PCT Filed: Sep. 18, 2017

(86) PCT No.: PCT/US2017/051965
§ 371 (c)(1),
(2) Date: Apr. 30, 2019

(87) PCT Pub. No.: WO2018/111365
PCT Pub. Date: Jun. 21, 2018

(65) Prior Publication Data
US 2019/0292419 A1  Sep. 26, 2019

Related U.S. Application Data

(60) Provisional application No. 62/434,460, filed on Dec. 15, 2016.

(51) Int. Cl.
| | | |
|---|---|---|
| C09J 183/14 | (2006.01) | |
| C09J 9/02 | (2006.01) | |
| C09J 11/04 | (2006.01) | |
| C09J 183/04 | (2006.01) | |
| C08G 77/20 | (2006.01) | |
| C08G 77/00 | (2006.01) | |
| C08K 3/08 | (2006.01) | |
| C08G 77/50 | (2006.01) | |

(52) U.S. Cl.
CPC .............. *C09J 183/14* (2013.01); *C09J 9/02* (2013.01); *C09J 11/04* (2013.01); *C09J 183/04* (2013.01); *C08G 77/20* (2013.01); *C08G 77/50* (2013.01); *C08G 77/70* (2013.01); *C08K 2003/0806* (2013.01)

(58) Field of Classification Search
CPC ....................................................... H01R 4/04
See application file for complete search history.

(56) References Cited

U.S. PATENT DOCUMENTS

| | | | |
|---|---|---|---|
| 5,611,844 A | 3/1997 | Troost et al. | |
| 6,433,055 B1 | 8/2002 | Kleyer et al. | |
| 6,433,057 B1 | 8/2002 | Bhagwager et al. | |
| 7,781,560 B2 | 8/2010 | Ushio et al. | |
| 8,580,073 B2 | 11/2013 | Behl et al. | |
| 9,441,086 B2 | 9/2016 | Albaugh et al. | |
| 2004/0100654 A1* | 5/2004 | Kodama | H04N 19/187 358/1.15 |
| 2009/0294734 A1* | 12/2009 | Yang | H01B 1/22 252/500 |
| 2015/0376482 A1 | 12/2015 | Bekemeier et al. | |
| 2016/0017185 A1* | 1/2016 | Albaugh | C08K 9/10 428/328 |
| 2017/0121462 A1 | 5/2017 | Fujisawa et al. | |

FOREIGN PATENT DOCUMENTS

WO  2016136245  9/2016

OTHER PUBLICATIONS

Reference list from corresponding China 201780074748.8 application, dated Nov. 20, 2020.
Reference list from corresponding Japan 2019-528692 application, dated Jul. 6, 2020.
Reference list from corresponding Korea 10-2019-7018994 application, dated Sep. 25, 2020.
3 Reasons Hot Melt Adhesives Are Better Than Solvent Based Adhesives, Sep. 7, 2016.
What Is Hotmelt Made of? Downloaded Mar. 16, 2021.
Hot Melt Adhesive_3M, Downloaded Mar. 16, 2021.

* cited by examiner

*Primary Examiner* — Marc S Zimmer

(57) ABSTRACT

A condensation-curable electrically conductive silicone adhesive composition, methods of making and using same, and manufactured articles and devices comprising or prepared from the same.

10 Claims, No Drawings

CONDENSATION-CURABLE ELECTRICALLY CONDUCTIVE SILICONE ADHESIVE COMPOSITION

CROSS REFERENCE TO RELATED APPLICATIONS

This application is a U.S. national stage filing under 35 U.S.C. § 371 of PCT Application No. PCT/US17/051965 filed on Sep. 18, 2017, currently pending, which claims the benefit of U.S. Provisional Patent Application No. 62/434,460 filed Dec. 15, 2016, under 35 U.S.C. § 119 (e). PCT Application No. PCT/US17/051965 and U.S. Provisional Patent Application No. 62/434,460 are hereby incorporated by reference.

TECHNICAL FIELD

A condensation-curable electrically conductive silicone adhesive composition, methods of making and using same, and manufactured articles and devices comprising or prepared from the same.

INTRODUCTION

Conventional adhesive compositions are used in diverse industries such as automotive, electronic, consumer product, construction, space and medical industries. Adhesive compositions are used to provide bonds that are resistant to heat or moisture or that provide other functions such as conduction. Adhesive compositions have been formulated to have additional functions such as mechanical properties, thermal conducting properties, or electrical conducting properties. Conductive adhesive compositions typically comprise a particulate conductive filler widely dispersed in a tacky or sticky matrix material, such as a tacky or sticky elastomer, which may be a thermoset or thermoplastic material. In addition to tack, adhesion, and cohesion properties, the matrix material usually provides the compositions with one or more mechanical properties. Adhesive compositions that are formulated for use in one industry or application may be unsuitable for use in another industry or application.

Conventional thermally conductive adhesive compositions that conduct heat, but not electric current, typically comprise a thermally conductive filler, such as particulate ceramic, that does not conduct electricity. But other conventional adhesive compositions that conduct heat, but not electric current, may contain a particulate electrically-and-thermally conductive filler, provided that the concentration of the electrically-and-thermally conductive filler in the adhesive composition is lower than the filler's percolation threshold, which is the concentration required to enable electrical conduction in the adhesive composition. The percolation threshold of the electrically-and-thermally conductive filler is higher than the filler's working concentration for heat conduction alone. Too much electrically-and-thermally conductive filler in such a conventional adhesive composition intended only for thermal conduction may disadvantageously lead to electrical short circuiting of a device containing same (e.g., where the adhesive is used as a thermal interface material in a printed circuit board or as a pottant in a power converter/inverter), mechanical or adhesive failure of the adhesive composition in hostile environments, or filler-enhanced degradation of the matrix material.

Conventional electrically conductive adhesive (cECA) compositions generally comprise finely-divided particles of an electrically conductive filler widely dispersed, at a concentration greater than its percolation threshold, in a tacky or sticky matrix material. When placed in electrical communication between a source of electric current and a receiver of electric current, such a cECA composition conducts the electric current internally via the filler from the source to the receiver. The cECA compositions have a variety of uses such as to adhere to, and conduct electrical current to or from, electronic components such as components of printed circuit boards or components of photovoltaic cell modules. The cECA composition may also be used to adhere to and cover an interior surface of a housing containing electronic components so as to form a Faraday Cage that shields the electronic components from external electromagnetic radiation.

U.S. Pat. No. 5,611,844 to C. R. Bearinger, et al. relates to a method and composition for joining flip chips backside-up with respect to substrates by applying an adhesive between the active side of the flip chip and the substrate. The adhesive is a conductive silicone pressure-sensitive adhesive containing (i) a silicone resin, (ii) a siloxane gum, (iii) a conductive particulate material, and optionally, (iv) a peroxide catalyst.

U.S. Pat. No. 6,433,055 B1 to D. L. Kleyer, et al. relates to an electrically conductive hot-melt silicone adhesive composition comprising (A) a hot-melt silicone adhesive; (B) an electrically conductive filler in an amount sufficient to impart electrical conductivity to the composition, wherein the filler comprises particles having at least an outer surface of a metal selected from silver, gold, platinum, palladium, and alloys thereof; and (C) an effective amount of a hydroxy-functional organic compound having a molecular weight up to about 1000 and containing at least one hydroxy group per molecule, provided that when the composition is curable, the compound does not substantially inhibit cure (Abstract). The component (A) can be any hot-melt silicone adhesive known in the art, provided the silicone composition formed by combining component (A) with components (B) and (C) exhibits improved electrical performance compared with a similar silicone composition lacking only the (C) hydroxy-functional organic compound.

U.S. Pat. No. 6,433,057 B1 to D. E. Bhagwagar, et al. relates to a silicone composition, an electrically conductive adhesive comprising a reaction product of the composition and a multi-part silicone composition.

U.S. Pat. No. 8,889,261 B2 to L. Carbary, et al. relates to a gunnable adhesive composition for use in construction membrane applications. The gunnable adhesive composition includes a silicone resin and an organopolysiloxane; or a reaction product thereof; as well as a filler and a solvent (Abstract). The silicone resin contains monofunctional units represented by $R^1_3SiO_{1/2}$ (so-called M units) and tetrafunctional units represented by $SiO_{4/2}$ (so-called Q units). $R^1$ represents a substituted or unsubstituted monovalent hydrocarbon group.

US 2015/9376482 A1 by T. Bekemeier, et al. relates to moisture-curable hot melt silicone adhesive compositions including an alkoxy-functional siloxane reactive resin. The moisture-curable hot melt silicone adhesive compositions provide bonds resistant to heat and moisture in automotive, electronic, construction, space, medical and other industries. The moisture-curable silicone adhesive composition comprises (A) a reactive resin, (B) a reactive polymer, (C) a moisture cure catalyst, and (D) a crosslinker resin. The reactive resin (A) comprises the reaction product of a reaction of an alkenyl-functional siloxane resin comprising R3SiO1/2 units and SiO4/2 units and an alkoxysilane-functional organosiloxane compound having at least one silicon-bonded hydrogen atom in the presence of a hydrosilylation catalyst. The reactive polymer (B) comprises the reaction product of a reaction of an alkoxysilane-functional organosiloxane compound having at least one silicon-bonded hydrogen atom and a polyorganosiloxane having an average, per molecule, of at least 2 aliphatically unsaturated organic groups in the presence of a hydrosilylation catalyst.

SUMMARY

We (the present inventors) know that various technical strategies can be tried to optimize adhesion, electrical, mechanical, and stability performance characteristics of cECA compositions. A challenge is that there is only so much one can do to improve performance of cECA compositions that contain only the electrically conductive filler and prepolymer or polymer. Another challenge is that improving an electrical performance aspect may weaken adhesion or mechanical properties, or vice versa, and improving adhesion may weaken a mechanical property, or vice versa. Many newer cECA compositions further include one or more performance additives. For example, many cECA compositions use an adhesion promoter as an ingredient or primer to achieve satisfactory adhesion of the cECA composition to a substrate and/or adhesion of the matrix material to the electrically conductive filler. The cECA compositions may use reactive organic compounds to improve electrical performance such as increase electrical conductivity, decrease initial contact resistance and/or decrease volume resistivity. The challenges remain.

Our technical solution comprises an electrically conductive silicone adhesive (ECSA) composition, methods of making and using same, and manufactured articles and devices comprising or prepared from the same. The ECSA composition comprises a reactive MQ organosiloxane resin, a reactive polydiorganosiloxane polymer, and a particulate metal-based filler.

DETAILED DESCRIPTION OF THE INVENTION

The Brief Summary and Abstract are incorporated here by reference. Although the ECSA composition may further comprise a performance additive, the ECSA can achieve improved adhesion, electrical, mechanical, and/or stability performance without it. The ECSA composition's performance is such that a specific level of electrical performance can be achieved with a lower loading of the particulate metal-based filler (i.e., a lower concentration of the particulate metal-based filler in the ECSA composition) relative to the loading of same filler required to achieve the same level of electrical performance in a comparative (non-invention) ECA composition that does not contain the reactive MQ organosiloxane resin. At the lower filler loading in the ECSA composition, its mechanical properties, such as tensile strength and/or elongation at break, are maintained or improved relative to those of a comparative ECSA composition, which has the higher filler loading. This invention is described herein in an illustrative manner by disclosing a plurality of representative, non-limiting embodiments and examples. In some embodiments the invention is any one of the following numbered aspects.

Aspect 1. A condensation-curable electrically conductive silicone adhesive composition (condensation-curable ECSA composition) comprising constituents (A) to (C): (A) a reactive MQ organosiloxane resin that is a product of a hydrosilylation reaction of a $(C_2$-$C_6)$alkenyl group-functional MQ organosiloxane resin, containing a first concentration of the $(C_2$-$C_6)$alkenyl groups, and a compound of formula (I) $(R^1O)_3Si$—$(C_1$-$C_6)$alkylene-$Si(R^2)_2O$—$Si(R^3)_2H$ (I), wherein each $R^1$ is independently $(C_1$-$C_3)$alkyl, each $R^2$ is independently $(C_1$-$C_3)$alkyl, and each $R^3$ is independently $(C_1$-$C_3)$alkyl; (B) a reactive polydiorganosiloxane polymer that is a product of a hydrosilylation reaction of a same or different compound of formula (I) and a $(C_2$-$C_6)$alkenyl group-terminated polydiorganosiloxane, having a dynamic viscosity from 5,000 to 200,000 centipoise (cp) at 25 degrees Celsius (° C.) and wherein each organo group is independently $(C_1$-$C_3)$alkyl; and at least one (C) particulate metal-based filler, wherein the concentration of the constituent (C) is from 15 to 80 volume percent (vol %) based on total volume of the condensation-curable ECSA composition; wherein concentration of constituent (A) is from 40 to 70 weight percent (wt %) based on total weight of constituents (A) and (B); and wherein the total weight of constituents (A) to (C) is less than or equal to 100 wt % of the condensation-curable ECSA composition.

Aspect 2. The condensation-curable electrically conductive silicone adhesive composition of aspect 1 wherein: (i) the (A) reactive MQ organosiloxane resin is a product of a hydrosilylation reaction of a $(C_2)$alkenyl group-functional MQ organosiloxane resin, containing a first concentration of the $(C_2)$alkenyl groups, and a compound of formula (I) $(R^1O)_3Si$—$(C_1$-$C_6)$alkylene-$Si(R^2)_2O$—$Si(R^3)_2H$ (I), wherein at least one, at least two, or each of $R^1$, $R^2$, and $R^3$ is methyl; or (ii) the (A) reactive MQ organosiloxane resin is characterized by a weight-average molecular weight (Mw) from 1,000 grams per mole (g/mol) to 30,000 g/mol; or 4,000 g/mol to 25,000 g/mol; or 5,000 g/mol to 20,000 g/mol; or (iii) the (A) reactive MQ organosiloxane resin is characterized as a product of a hydrosilylation reaction wherein 15 mole percent (mol %) to 90 mol %, 25 mol % to 75 mol %, or 25 mol % to 50 mol % of the first concentration of the $(C_2$-$C_6)$alkenyl groups of the $(C_2$-$C_6)$alkenyl group-functional MQ organosiloxane resin have been hydrosilylation reacted with the compound of formula (I); or (iv) a combination of (i) and (ii), (i) and (iii), (ii) and (iii), or (i), (ii), and (iii).

Aspect 3. The condensation-curable electrically conductive silicone adhesive composition of aspect 1 or 2 wherein: (i) the (B) reactive polydiorganosiloxane polymer is a product of a hydrosilylation reaction of a $(C_2)$alkenyl group-terminated polydiorganosiloxane having a dynamic viscosity at 25° C. from 10,000 cp to 150,000 cp, or 40,000 cp to 100,000 cp; or (ii) at least 50%, at least 90%, or each organo group of the reactive polydiorganosiloxane polymer is methyl; or (iii) the compound of formula (I) used in the hydrosilylation reaction to make constituent (B) has at least one, at least two, or each of $R^1$, $R^2$, and $R^3$ is methyl; or (iv) a combination of (i) and (ii); (i) and (iii); (ii) and (iii); or (i), (ii), and (iii).

Aspect 4. The condensation-curable electrically conductive silicone adhesive composition of any one of aspects 1 to 3 wherein: (i) the metal of the (C) particulate metal-based filler is an element of any one of Groups 1 to 13 of the Periodic Table of the Elements, tin, lead, antimony, a lanthanide, an actinide, a blend of any two or more such metals, an alloy of any two or more such metals, or a core-shell particle comprising a shell composed of any one of such metals or such alloy and a core composed of a metallic or non-metallic support material (e.g., a non-metallic support material that is a glass bead); or (ii) the metal of the constituent (C) particulate metal-based filler is silver; copper; gold; aluminum; molybdenum; zinc; tungsten; nickel;

iron; palladium; platinum; tin; lead; titanium; a metal alloy selected from bronze, brass 67Cu33Zn, carbon steel, grain oriented electrical steel, MANGANIN, constantin, or nichrome; or a blend of any two or more of the foregoing metals and alloys; or (iii) or the (C) particulate metal-based filler is from 20 vol % to 50 vol %, or 30 vol % to 45 vol %, or 35 to 40 vol % of the condensation-curable ECSA composition; or (iv) a combination of (i) and (ii); (i) and (iii); (ii) and (iii); or (i), (ii), and (iii). In some aspects the (C) particulate metal-based filler includes a silver-coated glass beads, alternatively a blend of any two (C), alternatively each of the following (C): silver particles, silver-coated aluminum particles, and silver-coated glass beads. In some aspects the blend is each of the following (C): silver particles, silver-coated aluminum particles, and silver-coated glass beads and the total (C) content is 35 to 40 vol % of the condensation-curable ECSA composition.

Aspect 5. The condensation-curable electrically conductive silicone adhesive composition of any one of aspects 1 to 4 further comprising at least one of constituents (D) to (I): (D) a condensation catalyst; (E) a vehicle; (F) a crosslinker; (G) a moisture scavenger; (H) and adhesion promoter; (I) a non-reactive MQ organosiloxane resin having Mw from 3,000 to 10,000 g/mol, wherein when present the amount of (H) is from >0 wt % to 70 wt % of the combined weight of (A)+(I); and (J) silica.

Aspect 6. The condensation-curable electrically conductive silicone adhesive composition of any one of aspects 1 to 5 wherein (i) the concentration of the constituent (A) is 45 wt % to 65 wt %, or 50 wt % to 60 wt % based on total weight of constituents (A) and (B); (ii) the concentration of constituent (C) is from 20 wt % to 60 wt %, or 25 wt % to 55 wt %, or 30 wt % to 50 wt % based on total weight of the condensation-curable electrically conductive silicone adhesive composition; (iii) the condensation-curable ECSA composition is characterized by a bulk volume resistivity (ρ) of from >0 to 10 ohm-centimeters, alternatively from >0 ohm-centimeter to <0.10 ohm-centimeter; or (iv) a combination of (i) and (ii), or (i) and (iii), or (ii) and (iii), or (i), (ii), and (iii).

Aspect 7. A cured product of condensation curing the condensation-curable electrically conductive silicone adhesive composition of any one of aspects 1 to 6 to give a condensation-cured electrically conductive silicone adhesive composition.

Aspect 8. A manufactured article comprising a physically-shaped form of the condensation-curable electrically conductive silicone adhesive composition of any one of aspects 1 to 6 or a physically-shaped form of the cured product of aspect 7.

Aspect 9. An electrical device comprising a substrate and the condensation-curable electrically conductive silicone adhesive composition of any one of aspects 1 to 6 or the cured product of aspect 7, disposed on the substrate.

Aspect 10. A method of making the condensation-curable electrically conductive silicone adhesive composition of any one of aspects 1 to 6, the method comprising mixing constituents comprising constituents (A) and (B), and optionally a (E) vehicle, to give a homogeneous mixture of (A) and (B) and optionally (E); dispersing constituent (C) into the homogeneous mixture to give a filled mixture; and dispersing a (D) condensation catalyst, and optionally (F) crosslinker and/or (G) moisture scavenger, into the filled mixture to give the condensation-curable electrically conductive silicone adhesive composition.

Aspect 11. A method of making the cured product of aspect 7, the method comprising contacting the condensation-curable electrically conductive silicone adhesive composition of any one of aspects 1 to 6 with moisture to give a contacted composition, and optionally heating the contacted composition, to give the cured product.

Aspect 12. A method of making the manufactured article of aspect 8, the method comprising physically shaping the condensation-curable electrically conductive silicone adhesive composition into a physically-shaped form, and optionally condensation curing the physically-shaped form of the condensation-curable electrically conductive silicone adhesive composition to give the physically-shaped form of the cured product, to give the manufactured article.

Aspect 13. A method of making the electrical device of aspect 9, the method comprising applying the condensation-curable electrically conductive silicone adhesive composition to the substrate to give the electrical device, or applying the cured product to the substrate to give the electrical device, or curing the applied condensation-curable electrically conductive silicone adhesive composition on the substrate to give the electrical device.

Aspect 14. The invention of any one of aspects 1 to 13 wherein: (i) the concentration of (C) particulate metal-based filler is from 70 weight percent (wt %) to 80 wt %, alternatively 75 wt % to 79 wt %, based on total weight of the condensation-curable ECSA composition; or (ii) the (C) particulate metal-based filler comprises silver or an alloy of silver and aluminum; or (iii) both (i) and (ii).

Aspect 15. The invention of any one of aspects 1 to 14 wherein the total weight of constituents (A) and (B) is from 19 wt % to 21 wt %, based on total weight of the condensation-curable ECSA composition.

Aspect 16. The invention of any one of aspects 1 to 15 wherein the condensation-curable ECSA composition further comprises: (i) (D1) a condensation catalyst that is based on tin, zirconium, or titanium (e.g., titanium diisopropoxy diethylacetoacetate (TDIDE) or tetra(tert-butyl)titanate (TTBT)); or (ii) (E1) a vehicle that is a multialkoxy-functional silane (e.g., methyltrimethoxysilane, isobutyltrimethoxysilane, tetraethoxysilane, or a combination of any two or more thereof); or (iii) (F1) a crosslinker; or (iv) (G1) a moisture scavenger that is an alkoxysilane; or (v) (D1) and (E1); or (vi) (D1) and (F1); or (vii) (D1) and (G1); or (viii) (D1), (E1), and (F1); or (ix) (D1), (E1), and (G1); or (x) (D1), (E1), (F1), and (G1). In some aspects (D1) is from 0.10 to 0.30 wt %; (E1) is from 0.10 to 1.0 wt %; (F1) is from 0 wt % to 5 wt %; and (G1) is from 1 to 2 wt %; based on total weight of the condensation-curable ECSA composition. TDIDE has CAS 27858-32-8 and is sold as Tyzor PITA, and TTBT has CAS 3087-39-6 and is sold as Tyzor 9000, both by Dorf Ketal.

Aspect 17. The invention of any one of aspects 1 to 16 wherein the condensation-curable ECSA composition has a volume resistivity (VR) of from 0.0001 to 0.1 Ohm-centimeters (Ohm-cm), alternatively 0.001 to 0.1 Ohm-cm, alternatively from 0.003 to 0.010 Ohm-cm, alternatively from 0.005 to 0.013 Ohm-cm; all measured according to the Volume Resistivity Test Method described later.

Aspect 18. The invention of any one of aspects 1 to 17 wherein the condensation-curable ECSA composition is cured to give a condensation-cured ECSA composition that is characterized by: (i) a volume resistivity (VR) of from 0.0001 to 0.1 Ohm-cm, alternatively 0.001 to 0.1 Ohm-cm, alternatively from 0.001 to 0.030 Ohm-cm, alternatively from 0.003 to 0.021 Ohm-cm, all measured according to the Volume Resistivity Test Method described later; or (ii) an adhesion (ADHES) of AF moderate to AF/CF high, alternatively AF high to AF/CF high, alternatively AF/CF high, all measured according to the Adhesion Test Method described later; or (iii) a bead flow (BF) of NS as measured according to the Bead Flow Test Method described later; or (iv) a durometer (DUR) of from 30 to 90, alternatively 40 to 80, alternatively from 50 to 76, all measured according to the Durometer Test Method described later; or (v) an elongation-at-break (E@B) of from 10% to 400%, alternatively from 15% to 350%, alternatively from 17% to 340%, all measured according to the Elongation-at-Break Test Method described later; or (vi) a stress at 12.5% strain (S@S) of from 300 to 2000 kPa, alternatively from 500 to 1800 kPa, alternatively from 800 to 1700 kPa, all measured according to the Stress at 12.5% strain Test Method described later; or (vii) a tensile strength (TS) of from 1000 to 2000 kPa, alternatively from 1050 to 1800 kPa, alternatively from 1100 to 1700 kPa, all measured according to the Tensile Strength Test Method described later; or (viii) (i) and (ii); or (ix) (i) and (iii); or (x) (i) and (iv); or (xi) (i) and (v); or (xii) (i) and (vi); or (xiii) (i) and (vii); or (xiv) (iv) and (v); or (xv) (iv) and (vi); or (xvi) (iv) and (vii); or (xvii) at least two of (v) to (vii); or (xviii) each of (v) to (vii); or (xix) (iv) and (xvii); or (xx) (iv) and (xix).

The condensation-curable ECSA composition comprises constituents (A), (B), (C), and optionally further comprises 0, 1, or more of constituents (D) to (H), described later.

Constituent (A): the reactive MQ organosiloxane resin. Constituent (A) is a product of a hydrosilylation reaction of a $(C_2-C_6)$alkenyl group-functional MQ organosiloxane resin, containing a first concentration of the $C_2-C_6$ alkenyl groups, and a compound of formula (I) $(R^1O)_3Si-(C_1-C_6)$ alkylene-$Si(R^2)_2O-Si(R^3)_2H$ (I), wherein each $R^1$ is independently $(C_1-C_3)$alkyl, each $R^2$ is independently $(C_1-C_3)$ alkyl, and each $R^3$ is independently $(C_1-C_3)$alkyl. The (A) is typically present in the composition at a concentration of from 20 to 99.9 weight percent (wt %) based on total weight of the composition.

Constituent (B): the reactive polydiorganosiloxane polymer. Constituent (B) is a product of a hydrosilylation reaction of a $(C_2-C_6)$alkenyl group-terminated polydiorganosiloxane, having a dynamic viscosity from 5,000 to 200,000 cp at 25° C. and wherein each organo group is independently $(C_1-C_3)$alkyl, and a same or different compound of formula (I). The (B) is typically present in the composition at a concentration from 0.01 part to 400 parts, alternatively from 100 to 400 parts, alternatively from 0.01 to 100 parts, alternatively from 0.01 to 50 parts, all based on 100 parts of the (A) silsesquioxane resin.

In some aspects (B) is comprised of difunctional units of the formula $R^2R^3SiO$ and terminal units of the formula $R^1_aX'_{(3-a)}SiG$-, wherein $R^2$ is an alkoxy group or a monovalent unsubstituted or substituted hydrocarbon radical; $R^3$ is a unsubstituted or substituted monovalent hydrocarbon radical; $R^1$ is a group as described above, X' is a hydrolyzable group; G is an oxygen atom or a divalent group linking the silicon atom of the terminal unit with another silicon atom and a is 0 or 1. The organopolysiloxane can optionally contain up to 20%, based on total of trifunctional units of the formula $R^3SiO_{3/2}$ where $R^3$ is as described previously. At least 50%, typically at least 80%, of the radicals represented by $R^2$ and $R^{33}$ in the $R^2R^3SiO$ units are lower alkyl such as methyl.

The terminal units in (B) present on the organopolysiloxane are represented by the formula $R^1_aX'_{(3-a)}SiG$-, where X' is a hydrolyzable group, $R^1$ is a group as described above, G is an oxygen atom or a divalent group linking the silicon atom of the terminal unit with another silicon atom and subscript a is 0 or 1. Typically the organopolysiloxane contains an average of two or more hydrolyzable (X') groups per molecule in order to form a crosslinked product. Typical hydrolyzable groups represented by X' include but are not limited to hydroxy, alkoxy such as methoxy and ethoxy, alkenyloxy such as isopropenyloxy, enoxy, ketoximo such as methylethylketoximo, carboxy such as acetoxy, amidoxy such as acetamidoxy and aminoxy such as N,N-dimethylaminoxy.

In the terminal units or groups of formula $R^1_aX'_{(3-a)}SiG$- for (B) when subscript a is 0 the groups represented by X' can be alkoxy, ketoximo, alkenyloxy, carboxy, aminoxy or amidoxy. When subscript a is 1, X' is typically alkoxy and $R^1$ is alkyl such as methyl or ethyl, or aminoalkyl such as aminopropyl or 3-(2-aminoethylamino)propyl. The amino portion of the aminoalkyl radical can be primary, secondary or tertiary.

In the aspects of (B), the formula for the terminal unit G is a divalent group or atom that is hydrolytically stable. By hydrolytically stable it is meant that it is not hydrolyzable and links the silicon atom(s) of the terminal unit to another silicon atom in the organopolysiloxane such that the terminal unit is not removed during curing of the composition and the curing reaction is not adversely affected. Hydrolytically stable linkages represented by G include but are not limited to oxygen, hydrocarbylene such as alkylene and phenylene, hydrocarbylene containing one or more hetero atoms selected from oxygen, nitrogen and sulfur, and combinations of these linking groups. G can represent a silalkylene linkage such as $-(OSiMe_2)CH_2CH_2-$, $-(CH_2CH_2SiMe_2)(OSiMe_2)CH_2CH_2-$, $-(CH_2CH_2SiMe_2)O-$, $(CH_2CH_2SiMe_2)OSiMe_2)O-$, $-(CH_2CH_2SiMe_2)CH_2CH_2-$ and $-CH_2CH_2-$, a siloxane linkage such as $-(OSiMe_2)O-$ or, more preferably, an oxygen atom.

In the aspects of (B), specific examples of preferred terminal units include, but are not limited to, $(MeO)_3SiCH_2CH_2-$, $(MeO)_3SiO-$, $Me(MeO)_2SiO-$, $(EtO)_3SiO-$, $(MeO)_3SiCH_2CH_2SiMeCH_2SiMeCH_2$ $CH_2SiMe_2O-$, and $CH_2=C(CH_3)OSiO-$. Me in these formulae represents methyl and Et represents ethyl.

In the aspects of (B) when X' contains an alkoxy group, it may be desirable to separate this X' group from the closest siloxane unit by an alkylene radical such as ethylene. In this instance $R^1_aX'_{(3-a)}SiG$- would be $(MeO)_3SiCH_2CH_2Si(Me_2)O-$. Methods for converting alkoxy groups to trialkoxysilylalkyl groups are described in the prior art. For example, moisture reactive groups having the formulae $(MeO)_3SiO-$ and $Me(MeO)_2SiO-$ can be introduced into a silanol-terminated polyorganosiloxane by compounds having the formulae $(MeO)_4Si$ and $Me(MeO)_3Si$, respectively. Alternatively, compounds having the formulae $(MeO)_3SiH$ and $Me(MeO)_2SiH$, respectively, can be used when the polyorganosiloxane contains alkenyl radicals such as vinyl and a platinum group metal or a compound thereof as a hydrosilylation reaction catalyst. It will be understood that other hydrolyzable groups such as dialkylketoximo, alkenyloxy and carboxy can replace the alkoxy group.

In the aspects of (B) may be a polydimethylsiloxane containing three alkoxy or ketoximo groups, two ketoximo groups or two alkoxy groups together with either an alkyl or aminoalkyl radical. The viscosity of the organopolysiloxane may be in the range of 0.02 Pa·s to 100 Pa·s at 25° C., typically 0.35 to 60 Pa·s.

Constituent (C): the particulate metal-based filler. The (C) particulate metal-based filler may have a volume resistivity ($\rho$) at 20° C. less than 0.0001 Ohm-centimeter and an electrical conductivity (K) at 20° C. greater than $1\times10^6$ Siemens per meter (S/m)). The particulate metal-based filler may be dispersible and form a colloidal suspension in the constituent (A), (B), or a product of a hydrosilylation reaction of constituents (A) and (B).

In some aspects the metal of the constituent (C) particulate metal-based filler is an element of any one of Groups 1 to 13 of the Periodic Table of the Elements, tin, lead, antimony, a lanthanide, an actinide, a blend of any two or more such metals, an alloy of any two or more such metals, or a core-shell particle comprising a shell composed of any one of such metals or such alloy and a core composed of a metallic or non-metallic support material. The metal may be silver, copper, gold, aluminum, calcium, molybdenum, zinc, lithium, tungsten, nickel, iron, palladium, platinum, tin, lead, titanium, and mercury; or any one metal alloy selected from bronze, brass 67Cu33Zn, carbon steel, grain oriented electrical steel, MANGANIN, constantin, and nichrome; or a physical blend of any two or more of copper, gold, aluminum, calcium, molybdenum, zinc, lithium, tungsten, nickel, iron, palladium, platinum, tin, lead, titanium, mercury, bronze, brass 67Cu33Zn, carbon steel, grain oriented electrical steel, MANGANIN, constantin, and nichrome. The metal may be silver, copper, or gold. Alternatively, the metal may lack silver, copper and gold such that the metal may be: any one metal of aluminum, calcium, molybdenum, zinc, lithium, tungsten, nickel, iron, palladium, platinum, tin, lead, titanium, and mercury; or any one metal alloy of carbon steel, grain oriented electrical steel, and nichrome; or a physical blend of any two or more of aluminum, calcium, molybdenum, zinc, lithium, tungsten, nickel, iron, palladium, platinum, tin, lead, titanium, mercury, carbon steel, grain oriented electrical steel, and nichrome.

The constituent (C) may be silver or silver-coated core particles. The silver particles mean a finely divided solid form of the element having atomic number 47 (Ag), wherein the silver particles overall have at least 90 atomic percent (at %) Ag, alternatively >95 at % Ag, alternatively >98 at %, alternatively >99.99 at % Ag.

When constituent (C) comprises the core-shell particles, the core material may be a solid or liquid. The core material may be a liquid having a boiling point >300° C. (e.g., mercury), alternatively a solid. The core material may be a single particle, alternatively a cluster or agglomerate of a plurality of particles. The core material may be electrically conductive or electrically non-conductive (insulating). The core material may be a different metal than the metal of the shell or the core material may be may be silicate glass (e.g., soda-lime-silicate glass or borosilicate glass), diamond polymorph of carbon, silica, organic polymer, organosiloxane polymer, or a ceramic. The core material may be solid or hollow. In some aspects the core material may be aluminum; silicate glass; carbon; a ceramic; copper; iron; lithium; molybdenum; nickel; organic polymer; palladium; platinum; silica; tin; tungsten; zinc; or a metal alloy of any two or more of aluminum, copper, iron, lithium, molybdenum, nickel, palladium, platinum, tin, tungsten, and zinc; or a physical blend of any two or more of aluminum; silica glass; carbon; a ceramic; copper; iron; lithium; molybdenum; nickel; organic polymer; palladium; platinum; silica; tin; tungsten; zinc; and the metal alloy.

The silver particles (e.g., silver flakes) and the Ag-coated core particles independently may be surface treated. For example, such particles may be surface treated to improve (i.e., increase) "wetability" by the curable organosiloxane composition and/or dispersability in the curable silicone composition, ECSA, or both. The surface treatment may comprise contacting the particles with a chemical substance such as an acid, base, compatibilizer, lubricant, or processing aid. The chemical substance may be aqueous sodium hydroxide, a ($C_4$-$C_{28}$)carboxylic acid or ester (e.g., a fatty acid or fatty acid ester), the hydrocarbon vehicle, a silicon-containing compound, or sulfuric acid. The silicon-containing compound may be an organochlorosilane, organosiloxane, organodisilazane, organoalkoxysilane. The lubricant may be used to treat the silver particles during a milling process of making silver flakes from silver powder to prevent the silver powder from cold welding or forming agglomerates. The chemical substance may, alternatively may not, be removed from the silver particles and/or the Ag-coated core particles before the particles are mixed with other ingredients of the curable silicone composition. Even if the treated particles are washed with solvent after the treating process, some chemical substances such as the lubricant or compatibilizer may remain chemisorbed on the surface of the particles.

Constituent (D) condensation catalyst. (D) may be a condensation catalyst, such as a titanium, tin, or zirconate based condensation catalyst, such as a titanium alkoxide, such as a titanium tetrabutoxide. Examples of (D) are described in U.S. Pat. No. 8,580,073 B2.

Constituent (E) vehicle. Examples of (E) solvent are hydrocarbons such as isoalkanes, aromatic hydrocarbons (e.g., xylenes), one or more volatile permethylsiloxanes (e.g., hexamethyldisiloxane, octamethyltrisiloxane, linear decamethyltetrasiloxane, cyclic octamethyltetrasiloxane, and decamethylpentasiloxane) and mixtures thereof. When present in the composition, the (E) vehicle may be at a concentration of from 0.1 wt % to 90 wt %, based on total weight of the composition.

Constituent (F) crosslinker. (F) is a dialkoxysilane, trialkoxysilane, or tetraalkoxysilane of formula $R^1{}_n Si(OR^2)_{4-n}$, wherein n is 2, 1, or 0; each $R^1$ is independently a ($C_1$-$C_8$)alkane, phenyl, or vinyl and each $R^2$ is independently a ($C_1$-$C_3$)alkane (e.g., methyltrimethoxysilane, isobutyltrimethoxysilane, tetraethoxysilane, vinyltriethoxysilane, or phenyltrimethoxysilane). Examples of (F) are found in U.S. Pat. No. 8,580,073 B2.

Constituent (G) moisture scavenger. (G) is hexamethyldisilazane (or other monofunctional moisture scavenger), a dialkoxysilane, trialkoxysilane, or tetraalkoxysilane of formula $R^1{}_n Si(OR^2)_{4-n}$, wherein n is 2, 1, or 0; each $R^1$ is independently a ($C_1$-$C_8$)alkane, phenyl, or vinyl and each $R^2$ is independently a ($C_1$-$C_3$)alkane (e.g., methyltrimethoxysilane, isobutyltrimethoxysilane, tetraethoxysilane, vinyltriethoxysilane, or phenyltrimethoxysilane). Examples of (G) are found in U.S. Pat. No. 8,580,073 B2. (G) independently may be the same as defined for (F) crosslinker. (F) may be used in excess of an amount desired for crosslinking such that the excess amount of (F) functions as (G).

Constituent (H) adhesion promoter. In some embodiments the composition (e.g., the chemically-amplifiable photoresist composition) is free of (lacks or not added) (H) adhesion promoter. In some embodiments the composition (e.g., the chemically-amplifiable photoresist composition) further comprises one or more (H) adhesion promoter. The (H) adhesion promoter may be used to enhance bonding of the composition to a substrate in need of patterning, such as a semiconductor wafer (e.g., silicon wafer) or a metal surface. The (H) adhesion promoter may also be used to enhance bonding to an underlayer of a multilayer resist, e.g., an underlayer such as an ARC, etching mask layer, or a hardcoat layer. Examples of (H) adhesion promoter are a silane coupling agent such as commercially available silane coupling agents. Silane coupling agents typically contain a functionalized alkyl group, plus three alkoxy groups or two alkoxy groups and an alkyl group, all bonded to the same silicon atom. The functionalized alkyl group may be an aminoalkyl group, an epoxy-alkyl group, an acryloxyalkyl group, a methacryloxyalkyl group, a ureidoalkyl group, an isocyanuratoalkyl group, a mercapto alkyl group, or an alkenyl group. Examples include vinyltrimethoxysilane, 2-(3,4-epoxycyclohexyl)ethyl-trimethoxysilane, and 3-glycidoxypropyl trimethoxysilane. When present in the silsesquioxane-containing composition (e.g., the photoresist composition), the (E) adhesion promoter may be at a concentration of from 0.01 wt % to 5 wt %, based on total weight of the composition.

Constituent (I): a non-reactive MQ organosiloxane resin having Mw from 2,000 to 10,000 g/mol, alternatively 3,000 to 8,000, alternatively 4,000 to 6,000 g/mol. In some aspects (I) is at a concentration of 25 to 60 wt %, alternatively 45 to 55 wt % of the combined weight of (A)+(I). When (I) is present, the corresponding amount of (A) is from <100 to 30 wt %, alternatively 75 to 40 wt %, alternatively 55 to 45 wt %, respectively, of the combined weight of (A)+(I) In some aspects (I) is (I1) described later.

(J) silica. In some aspects (J) is a fumed silica. In some aspects (J) is a hydrophobized fumed silica. In some aspects the hydrophobized fumed silica is a fumed silica that has been treated with hexamethyldisilazane. In some aspects, when (J) is present, (J) is at a concentration of 0.1 to 5 wt %, alternatively 1 to 4 wt %, alternatively 2 to 3 wt %, all based on total weight of the composition.

Total concentration of all constituents in the condensation-curable ECSA composition, and the condensation-cured ECSA composition prepared therefrom by curing, is 100%.

Suitable substrates are metal substrates such as tin, silver, gold, or aluminum; organic polymers; silicones; ceramics; silicate glass; wood; paper; and building materials.

Any compound herein includes all its isotopic forms, including natural abundance forms and isotopically-enriched forms. In some aspects, the isotopic form is the natural abundance form, alternatively the isotopically-enriched form. The isotopically-enriched forms may have additional uses, such as medical or anti-counterfeiting applications, wherein detection of the isotopically-enriched compound is helpful in treatment or detection.

As used herein, volume resistivity ($\rho$) and electrical conductivity (K) refer to bulk volume resistivity and bulk electrical conductivity. If a volume resistivity value and electrical conductivity value inadvertently conflict, the volume resistivity value controls The condensation-curable ECSA composition beneficially provides decreased volume resistivity relative to a comparative composition that is identical to the inventive condensation-curable ECSA composition except wherein a corresponding non-reactive component is used in place of present reactive constituent (A), a corresponding non-reactive component is used in place of present reactive constituent (B), or both. The condensation-cured ECSA composition, such as prepared by curing and aging the condensation-curable ECSA composition at 115° C. for 7 days, beneficially provides decreased volume resistivity.

The condensation-cured ECSA composition, such as prepared by curing and aging the condensation-curable ECSA composition at 115° C. for 7 days, beneficially provides increased durometer relative to the comparative composition.

The condensation-cured ECSA composition, such as prepared by curing and aging the condensation-curable ECSA composition at 115° C. for 7 days, beneficially provides increased stress at 12.5% strain relative to the comparative composition.

The condensation-cured ECSA composition, such as prepared by curing and aging the condensation-curable ECSA composition at 115° C. for 7 days, beneficially provides decreased elongation-at-break relative to the comparative composition.

The condensation-cured ECSA composition, such as prepared by curing and aging the condensation-curable ECSA composition at 115° C. for 7 days, beneficially provides comparable levels of tensile strength relative to the comparative composition.

Unless otherwise defined herein, named general terms have the following meanings. Alternatively precedes a distinct embodiment. Articles "a", "an", and "the" each refer to one or more. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). A Markush group of members A and B may be equivalently expressed as: "a member selected from A and B"; "a member selected from the group consisting of A and B"; or "a member A or B". Each member may independently be a subgenus or species of the genus. May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values.

Unless otherwise defined herein, ASTM means the standards organization, ASTM International, West Conshohocken, Pa., USA. Named chemical technology terms have the meanings defined by IUPAC or, for non-IUPAC terms, by Hawley's CONDENSED CHEMICAL DICTIONARY, 11$^{th}$ edition, N. Irving Sax & Richard J. Lewis, Sr., 1987 (Van Nostrand Reinhold). Some IUPAC terms are found in IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook. Average molecular mass of a polymer such as weight average molecular mass ("$M_w$") is determined using gel permeation chromatography (GPC) with polystyrene standards. Chemical element and Group of chemical elements shall mean those published by IUPAC in the Periodic Table of the Elements, version dated 1 May 2013. IEC is International Electrotechnical Commission, a standards organization in Geneva, Switzerland. Removing a component from a mixture of components may include separating the component from the other components of the mixture and/or derivatizing/reacting the component to form a derivative/product, and optionally separating the derivative/product from the other components of the mixture. Room temperature is 23° C.±1° C. unless indicated otherwise. Substituted when referring to a compound means having, in place of hydrogen, one or more substituents, up to and including per substitution. Vehicle means a liquid acting as a carrier, diluent, dispersant, storage medium, supernatant, or solvent for another material.

The invention is further illustrated by, and an invention embodiment may include any combinations of features and limitations of, the non-limiting examples thereof that follow.

Examples

CE1 means Comparative Example 1; IE1 means Inventive Example 1; and so on.

NMR: nuclear magnetic resonance (NMR) spectra were obtained on a Varian XL-400 MHz Mercury spectrometer with $CDCl_3$ as the solvent. Chemical shifts for $^1$H-NMR, $^{13}$C-NMR, and $^{29}$Si-NMR spectra were referenced to internal solvent resonance and are reported relative to tetramethylsilane.

GPC: gel permeation chromatography (GPC) analysis was conducted on a system comprising a Waters 600 pump, a Waters 717 autosampler, and a Waters 410 differential refractometer. Polystyrene standards were used.

Adhesion Test Method: Apply bead of test sample to substrate, cure test sample, then hand pick or hand peel cured test sample, and make relative judgment on adhesion force. More specifically, use a substrate material ENIG, immersion silver, immersion tin, immersion gold, or aluminum. Wipe substrate clean with paper towel/isopropanol. Wipe excess isopropanol off, and allow to air dry. Dispense 1 mm thick by 2 mm wide bead of test adhesive sample through a 0.85 mm inner diameter needle having a 2 cm length onto chosen substrate, ensuring contact of bead to substrate. Cure bead at 23° C., 50% relative humidity for 7 days. Peel or pull off resulting cured bead with fingers or spatula. Rate relative adhesion of cured bead to substrate as follows: low adhesion: adhesive weakly attached to substrate or falls off when attempting to peel it; Moderate: adhesive is fairly well attached but still requires only minor force to peel; High: adhesive is firmly attached and will stretch or break upon being pulled. Determine failure mode of test sample: adhesive failure mode is where cured bead fails at bond interface with substrate and there is no trace of adhesive remaining on substrate; cohesive failure mode is where adhesive is torn off from substrate, leaving cured adhesive on substrate. Record value of adhesive force and cohesive force (AF/CF) as low, moderate, or high and record failure mode.

Bead Flow Test Method: Dispense four separate horizontal 20 mm long lines of test sample through a 0.85 mm inner diameter needle having a 2 cm length spaced 5 mm apart from each other. Apply four more horizontal lines on top of, and at a 90° angle to (perpendicular), the first four dispensed lines to great intersections between top and bottom lines. Evaluate resulting lines over at least 4 hour period. Record value as NS or semiflow. NS means lines retain their dispensed shape even at line intersections; no detectable flowing of one line into another. Semiflow means good line profiles but line intersections will have some minor flow together. Flowable: lines do not retain their initial shape. Cannot detect which lines were applied on bottom and which on top.

Durometer Test Method: ASTM D-2240 Standard Test Method for Rubber Property—Durometer Test Method. Record value, which is unitless.

Elongation-at-break Test Method: ASTM D412 Standard Test Methods for Vulcanized Rubber and Thermoplastic Elastomers—Tension. Record value as a percent (%).

Stress at 12.5% strain Test Method: ASTM D412. Record value in pounds-per-square-inch (psi) and convert to kilopascals (kPa) using 1.00 psi=6.89 kPa.

Tensile Strength Test Method: ASTM D412 Record value in pounds-per-square-inch (psi) and convert to kilopascals (kPa) using 1.00 psi=6.89 kPa.

Volume Resistivity Test Method: The volume resistivity of curable test samples was determined using a four-point-probe instrument, GP 4-TEST Pro, from GP Solar GmbH, Germany. This instrument has a line resistance probe head and incorporates Precise Keithley electronics for current sourcing and voltage measurement. The line resistance probe head is constructed to measure electrical resistance through a 5 cm distance along a conductive strip the ECSA test sample. An aliquot of the test material was deposited on non-conductive substrate (e.g., silica glass or ceramic) by screen printing through apertures of dimension 5 mm×60 mm×0.25 mm. This formed a uniform line having an area of 5 mm×60 mm=300 mm$^2$. The spread test material was cured at room temperature under ambient (air) atmosphere for a minimum of 3 days to produce a test sample of the material (e.g., ECSA The voltage drop between the two inner probe tips was then measured at a selected current to provide a resistance value in ohms ($\Omega$).

Initial volume resistivity of the cured test samples was calculated using the equation $\rho=R(W \times T/L)$ where $\rho$ is the volume resistivity in Ohm-centimeters ($\Omega$-cm), R is the resistance in ohms ($\Omega$) of the cured composition measured between two inner probe tips spaced 5 cm apart, W is the width of the cured layer in cm, T is the thickness of the cured layer in cm, and L is the length of the cured layer between the inner probes in cm. The thickness of the cured layer was determined using a micrometer (Ono Sokki digital indicator number EG-225). If desired, a cross sectional area might be determined more accurately using a Zygo 7300 white light interferometer. Even so, all of the thickness measurements in the below examples were determined with the micrometer. Volume resistivity ($\rho$) in $\Omega$-cm units represents the average value of three measurements each performed on identically prepared test specimens. These measurements have a relative error of less than 10 percent.

Reactive MQ organosiloxane resin (A-1): (A-1) is a product of a hydrosilylation reaction of a vinyl group-functional MQ organosiloxane resin containing a 2 wt % concentration of vinyl groups 75 wt % nonvolatile content, trimethoxyethyl-capped, provided as a solution in xylene, a Mw of 18,000 to 24,000 g/mol, and a silanol (SiOH) content from 0 to <1.0 wt %, and a compound of formula (I-1) $(CH_3O)_3$Si-ethylene-Si$(CH_3)_2$O—Si$(CH_3)_2$H (I-1) from Dow Corning Corporation.

Non-Reactive MQ organosiloxane resin (NR-1): (NR-1) is a product of a hydrosilylation reaction of a vinyl group-functional MQ organosiloxane resin containing vinyl groups and having Mw of 17,000 to 22,000 g/mol, a silanol content of 0.8 wt %, and a compound of formula (I-1) $(CH_3O)_3$Si-ethylene-Si$(CH_3)_2$O—Si$(CH_3)_2$H (I-1) from Dow Corning Corporation.

Reactive polydiorganosiloxane polymer (B-1): (B-1) is a product of a hydrosilylation reaction of a vinyl group-terminated polydiorganosiloxane, having a dynamic viscosity of 57,000 cp at 25° C. and the compound of formula (I-1) $(CH_3O)_3$Si-ethylene-Si$(CH_3)_2$O—Si$(CH_3)_2$H (I-1) from Dow Corning Corporation.

Particulate metal-based filler (C-1): Ag flake. 0.86 m2/g surface area, 3.75 micrometer mean particle size Obtained as Chemet RA-0127 from Metalor.

Particulate metal-based filler (C-2): AgAl alloy granule 20 wt % silver/80 wt % Al, 40 micrometer mean particle diameter. Obtained as Conduct-O-Fil SA300S20 obtained from Potters Inc.

Ag-coated silicate glass microspheres (C₃): 4 wt % Ag content, 96 wt % silicate glass, 89 micrometer mean particle diameter. Obtain as Conduct-O-Fil S2429-S.

Condensation catalyst (D-1): TTBT. TTBT is Tyzor 9000 having Mw 340.3 g/mol.

Condensation catalyst (D-2): TDIDE. TDIDE is Tyzor PITA having MW 424.0 g/mol.

Vehicle (E-1): Xylenes. >98.5 vol % standard distribution of 1,2-, 1,3- and 1,4-Xylenes Moisture Scavenger (G-1): IBTMS is isobutyltrimethoxysilane.

Non-reactive MQ organosiloxane resin (I1): is a MQ organosiloxane resin provided as a 70 wt % nonvolatile content solution in xylene having 1.0/1.0 M/Q molar ratio having Mw 4,000 to 6,000 g/mol from Dow Corning 7708. Excess silanol (SiOH) groups have been reacted with trimethylsiloxy groups to render the resin non-reactive.

Fumed silica gel (J1): a hydrophobized fumed silica prepared by treating a pyrogenic fumed silica with hexamethyldisilazane. Obtain as TS530 silica from Cabot Corporation.

CE1a: preparation of a comparative condensation-curable ECSA composition 1. Mix non-reactive resin (NR-1) (7.21 g), reactive polymer (B-1) (5.19 g), IBTMS (1.06 g), TTBT (0.12 g), xylene (0.07 g), Ag flake (32.96 g; 18.75 vol %), AgAl alloy (13.38 g; 18.75 vol %) to give comparative condensation-curable ECSA composition 1. Composition has 37.50 vol % total (C) and is recorded later in Table 1.

IE1a: preparation of condensation-curable ECSA composition 1. Mix reactive resin (A-1) (6.89 g), reactive polymer (B-1) (5.17 g), IBTMS (1.06 g), TTBT (0.12 g), xylene (0.37 g), Ag flake (32.99 g; 18.75 vol %), AgAl alloy (13.40 g; 18.75 vol %) to give condensation-curable ECSA composition 1. Composition has 37.50 vol % total (C) and is recorded later in Table 1.

IE2a: preparation of condensation-curable ECSA composition 2. Mix reactive resin (A-1) (6.16 g), reactive polymer (B-1) (5.65 g), IBTMS (1.06 g), TTBT (0.12 g), xylene (0.56 g), Ag flake (33.03 g; 18.75 vol %), AgAl alloy (13.41 g; 18.75 vol %) to give condensation-curable ECSA composition 2. Composition has 37.50 vol % total (C) and is recorded later in Table 1.

IE3a: preparation of condensation-curable ECSA composition 3. Mix reactive resin (A-1) (7.63 g), reactive polymer (B-1) (4.68 g), IBTMS (1.06 g), TTBT (0.12 g), xylene (0.19 g), Ag flake (32.94 g; 18.75 vol %), AgAl alloy (13.38 g; 18.75 vol %) to give condensation-curable ECSA composition 3. Composition has 37.50 vol % total (C) and is recorded later in Table 1.

IE4a: preparation of condensation-curable ECSA composition 4. Mix reactive resin (A-1) (8.37 g), reactive polymer (B-1) (4.19 g), IBTMS (1.06 g), TTBT (0.12 g), Ag flake (32.90 g; 18.75 vol %), AgAl alloy (13.36 g; 18.75 vol %) to give condensation-curable ECSA composition 4. Composition has 37.50 vol % total (C) and is recorded later in Table 1.

IE5a: preparation of condensation-curable ECSA composition 5. Mix reactive resin (A-1) (6.79 g), reactive polymer (B-1) (5.09 g), IBTMS (1.06 g), TDIDE (0.15 g), xylene (0.50 g), Ag flake (33.00 g; 18.75 vol %), AgAl alloy (13.40 g; 18.75 vol %) to give condensation-curable ECSA composition 5. Composition has 37.50 vol % total (C) and is recorded below in Table 1.

IE6a: preparation of condensation-curable ECSA composition 6. Mix reactive resin (A-1) (8.61 g), reactive polymer (B-1) (5.29 g), IBTMS (1.73 g), TTBT (0.09 g), xylene (1.86 g), Ag flake (15.60 g; 7.40 vol %), AgAl alloy (25.35 g; 29.60 vol %), and fumed silica (J1) (1.47 g) to give condensation-curable ECSA composition 6. Composition has 39.76 vol % total (C) and is recorded below in Table 1.

IE7a: preparation of condensation-curable ECSA composition 7. Mix reactive resin (A-1) (9.21 g), reactive polymer (B-1) (5.65 g), IBTMS (1.85 g), TTBT (0.09 g), xylene (1.99 g), Ag flake (16.68 g; 7.40 vol %), AgAl alloy (13.55 g; 14.80 vol %), Ag/glass beads (C3) (9.41 g; 14.80 vol %), and fumed silica (J1) (1.57 g) to give condensation-curable ECSA composition 7. Composition has 39.76 vol % total (C) and is recorded below in Table 1.

IE8a: preparation of condensation-curable ECSA composition 8. Mix reactive resin (A-1) (4.24 g), reactive polymer (B-1) (5.21 g), MQ resin (I1) (4.24 g), IBTMS (1.71 g), TTBT (0.09 g), xylene (1.25 g), Ag flake (15.91 g; 7.40 vol %), AgAl alloy (25.85 g; 29.60 vol %), and fumed silica (J1) (1.50 g) to give condensation-curable ECSA composition 8. Composition has 39.76 vol % total (C) and is recorded below in Table 1.

IE9a: preparation of condensation-curable ECSA composition 9. Mix reactive resin (A-1) (4.54 g), reactive polymer (B-1) (5.57 g), MQ resin (I1) (4.54 g), IBTMS (1.83 g), TTBT (0.09 g), xylene (1.34 g), Ag flake (17.03 g; 6.56 vol %), AgAl alloy (25.85 g; 24.50 vol %), Ag/glass beads (C3) (9.61 g; 13.11 vol %), and fumed silica (J1) (1.60 g) to give condensation-curable ECSA composition 9. Composition has 46.62 vol % total (C) and is recorded below in Table 1.

Vol % values for Ag/glass beads (C3) include volume of glass beads.

TABLE 1 compositions of condensation-curable ECSA compositions

| Ex. No. | B-1 wt % | A-1 wt % | NR-1 wt % | IB-TMS wt % | TBTT wt % | TD-IDE wt % | Xylene wt % | Ag wt % | AgAl wt % | Ag/glass bead | Silica wt % | Total wt % |
|---|---|---|---|---|---|---|---|---|---|---|---|---|
| CE1a | 8.66 | 0 | 12.0 | 1.77 | 0.20 | 0 | 0.12 | 54.9 | 22.3 | 0 | 0 | 100 |
| IE1a | 8.61 | 11.5 | 0 | 1.77 | 0.20 | 0 | 0.62 | 55.0 | 22.3 | 0 | 0 | 100 |
| IE2a | 9.42 | 10.3 | 0 | 1.77 | 0.20 | 0 | 0.93 | 55.0 | 22.4 | 0 | 0 | 100 |
| IE3a | 7.80 | 12.7 | 0 | 1.77 | 0.20 | 0 | 0.31 | 54.9 | 22.3 | 0 | 0 | 100 |
| IE4a | 6.98 | 14.0 | 0 | 1.76 | 0.20 | 0 | 0 | 54.8 | 22.3 | 0 | 0 | 100 |
| IE5a | 8.49 | 11.3 | 0 | 1.77 | 0 | 0.25 | 0.84 | 55.0 | 22.3 | 0 | 0 | 100 |
| IE6a | 8.81 | 14.4 | 0 | 2.89 | 0.15 | 0 | 3.1 | 26.0 | 42.3 | 0 | 2.5 | 100 |
| IE7a | 9.42 | 15.3 | 0 | 3.09 | 0.16 | 0 | 3.3 | 27.8 | 22.6 | 15.7 | 2.6 | 100 |
| IE8a | 8.68 | 7.07 | 0 | 2.85 | 0.14 | 0 | 2.1 | 26.5 | 43.1 | 0 | 2.5 | 100 |
| IE9a | 7.74 | 6.31 | 0 | 2.54 | 0.13 | 0 | 1.9 | 23.7 | 35.9 | 13.4 | 2.2 | 100 |

Characterize comparative condensation-curable ECSA composition 1 of CE1a and inventive condensation-curable ECSA compositions 1 to 5 of IE1a to IE5a according to the Volume Resistivity Test Method (VR). The data are recorded later in Table 2.

CE1b: preparation of comparative condensation-cured ECSA composition 1. Cure the comparative condensation-curable ECSA composition 1 of CE1a at 22° C. and ambient humidity for 7 days to give comparative condensation-cured ECSA composition 1.

IE1b: preparation of condensation-cured ECSA composition 1. Cure the condensation-curable ECSA composition 1 of IE1a at 22° C. and ambient humidity for 7 days to give condensation-cured ECSA composition 1.

IE2b: condensation-cured ECSA composition 2. Cure the condensation-curable ECSA composition 2 of IE2a at 22° C. and ambient humidity for 7 days to give condensation-cured ECSA composition 2.

IE3b: preparation of condensation-curable ECSA composition 3. Cure the condensation-curable ECSA composition 3 of IE3a at 22° C. and ambient humidity for 7 days to give condensation-cured ECSA composition 3.

IE4b: preparation of condensation-curable ECSA composition 4. Cure the condensation-curable ECSA composition 4 of IE4a at 22° C. and ambient humidity for 7 days to give condensation-cured ECSA composition 4.

IE5b: preparation of condensation-curable ECSA composition 5. Cure the condensation-curable ECSA composition 5 of IE5a at 22° C. and ambient humidity for 7 days to give condensation-cured ECSA composition 5.

IE6b: preparation of condensation-cured ECSA composition 6. Cure the condensation-curable ECSA composition 6 of IE6a at 22° C. and ambient humidity for 7 days to give condensation-cured ECSA composition 6.

IE7b: preparation of condensation-cured ECSA composition 7. Cure the condensation-curable ECSA composition 7 of IE1a at 22° C. and ambient humidity for 7 days to give condensation-cured ECSA composition 7.

IE8b: preparation of condensation-cured ECSA composition 8. Cure the condensation-curable ECSA composition 8 of IE1a at 22° C. and ambient humidity for 7 days to give condensation-cured ECSA composition 8.

IE9b: preparation of condensation-cured ECSA composition 9. Cure the condensation-curable ECSA composition 9 of IE1a at 22° C. and ambient humidity for 7 days to give condensation-cured ECSA composition 9.

Characterize the comparative condensation-cured ECSA composition 1 of CE1b and the inventive condensation-cured ECSA compositions 1 to 9 of IE1b to IE9b, respectively, according to the Adhesion (ADHES), Bead Flow (BF), Durometer (DUR), Elongation-at-Break (E@B), Stress at 12.5% strain (S@S), Tensile Strength (TS), and Volume Resistivity (VR) using the respective Test Methods described earlier. The data are recorded below in Table 2

TABLE 2

Characterizations of condensation-cured ECSA compositions.

| Ex. No. | ADHES | BF | DUR | E@B | S@S (kPa) | TS (kPa) | Initial VR (Ω-cm) |
|---|---|---|---|---|---|---|---|
| CE1a | N/T | N/T | N/T | N/T | N/T | N/T | 3.76 |
| IE1a | N/T | N/T | N/T | N/T | N/T | N/T | 0.0206 |
| IE2a | N/T | N/T | N/T | N/T | N/T | N/T | 0.0271 |
| IE3a | N/T | N/T | N/T | N/T | N/T | N/T | 0.0133 |
| IE4a | N/T | N/T | N/T | N/T | N/T | N/T | 0.0051 |
| IE5a | N/T | N/T | N/T | N/T | N/T | N/T | 0.0127 |
| IE6a | N/T | N/T | N/T | N/T | N/T | N/T | 0.00933 |
| IE7a | N/T | N/T | N/T | N/T | N/T | N/T | 0.0468 |
| IE8a | N/T | N/T | N/T | N/T | N/T | N/T | 0.00737 |
| IE9a | N/T | N/T | N/T | N/T | N/T | N/T | 0.0526 |

| Ex. No. | ADHES | BF | DUR | E@B | S@S (kPa) | TS (kPa) | VR (Ω-cm) after 7 days at 115° C. |
|---|---|---|---|---|---|---|---|
| CE1b | AF, high | NS | 23 | 684% | 207 | 1430 | 0.117 |
| IE1b | AF, high | NS | 64 | 110% | 958 | 1140 | 0.0130 |
| IE2b | AF, mod | NS | 60 | 336% | 882 | 1320 | 0.0201 |
| IE3b | AF/CF, high | NS | 66 | 41% | 1140 | 1250 | 0.00783 |
| IE4b | AF/CF, high | NS | 75 | 17% | 1650 | 1690 | 0.00285 |
| IE5b | AF, high | NS | 64 | 223% | 971 | 1340 | 0.0134 |
| IE6b | Not tested | NS | 75 | 21% | 184 | 223 | 0.0826 |
| IE7b | Not tested | NS | 58 | 63% | 166 | 183 | 0.791 |
| IE8b | Not tested | NS | 60 | 434% | 121 | 187 | 0.006717 |
| IE9b | Not tested | NS | 60 | 460% | 102 | 170 | 0.0436 |

As shown by the data in Table 2, and as contrasted by comparing the data for IE1a to the data for CE1a and comparing the data for IE1b to the data for CE1b, the present technical solution beneficially provides decreased volume resistivity-see VR data for IE1a to IE5a relative to VR datum for comparative CE1a. The technical solution also beneficially provides increased durometer after curing at 22° C. for 7 days; see DUR data for IE1 b to IE5b relative to DUR datum for comparative CE1 b. The technical solution also beneficially provides increased stress at 12.5% strain after curing at 22° C. for 7 days; see S@S data for IE1b to IE5b relative to S@S datum for comparative CE1b. The technical solution also beneficially provides decreased elongation-at-break after curing at 22° C. for 7 days; see E@B data for IE1b to IE5b relative to E@B datum for comparative CE1b. The technical solution also beneficially provides increased elongation, when including an optional nonreactive resin (constituent (I)) after curing at 22° C. for 7 days; see S@S data for IE6b to IE7b and IE8b to IE9b relative to S@S datum for comparative CE1b. This increased elongation is valuable in applications where low electrical resistivity and higher movements are expected from the material, such as electronic devices the experience large thermal changes during operation.

The below claims are incorporated by reference here, and the terms "claim" and "claims" are replaced by the term "aspect" or "aspects," respectively. Embodiments of the invention also include these resulting numbered aspects.

The invention claimed is:

1. A condensation-curable electrically conductive silicone adhesive composition (condensation-curable ECSA composition) comprising:
   (A) a reactive MQ organosiloxane resin that is a product of a hydrosilylation reaction of a $(C_2-C_6)$alkenyl group-functional MQ organosiloxane resin, containing a first concentration of the $(C_2-C_6)$alkenyl groups, and a compound of formula (I) $(R^1O)_3Si—(C_1-C_6)$alkylene-$Si(R^2)_2O—Si(R^3)_2H$ (I), wherein each $R^1$ is independently $(C_1-C_3)$alkyl, each $R^2$ is independently $(C_1-C_3)$alkyl, and each $R^3$ is independently $(C_1-C_3)$alkyl;
   (B) a reactive polydiorganosiloxane polymer that is a product of a hydrosilylation reaction of a same or different compound of formula (I) and a $(C_2-C_6)$alkenyl group-terminated polydiorganosiloxane, having a dynamic viscosity from 5,000 to 200,000 centipoise (cp) at 25 degrees Celsius (° C.) and wherein each organo group is independently $(C_1-C_3)$alkyl; and (C) at least one kind of particulate metal-based filler; and (E) a vehicle solvent present at a concentration of 0.1 to 90 wt % based on total weight of the composition, wherein concentration of constituent (A) is from 40 to 70 weight percent (wt %) based on total weight of constituents (A) and (B);

wherein the amount of the constituent (C) is from 15 to 80 volume percent (vol %) based on total volume of the condensation-curable ECSA composition; and wherein the total weight of constituents (A) to (C) is less than or equal to 100 wt % of the condensation-curable ECSA composition.

2. The condensation-curable electrically conductive silicone adhesive composition of claim 1 wherein the (A) reactive MQ organosiloxane resin:

(i) is a product of a hydrosilylation reaction of a $(C_2)$ alkenyl group-functional MQ organosiloxane resin, containing a first concentration of the $(C_2)$alkenyl groups, and a compound of formula (I) $(R^1O)_3Si-(C_1-C_6)$alkylene-$Si(R^2)_2O-Si(R^3)_2H$ (I), wherein at least one, at least two, or each of $R^1$, $R^2$, and $R^3$ is methyl; or (ii) is characterized by a weight-average molecular weight (Mw) from 1,000 grams per mole (g/mol) to 30,000 g/mol; or (iii) is characterized as a product of a hydrosilylation reaction wherein 15 mole percent (mol %) to 90 mol % of the first concentration of the $(C_2-C_6)$alkenyl groups of the $(C_2-C_6)$alkenyl group-functional MQ organosiloxane resin have been hydrosilylation reacted with the compound of formula (I); or (iv) is a combination of (i) and (ii), (i) and (iii), (ii) and (iii), or (i), (ii), and (iii).

3. The condensation-curable electrically conductive silicone adhesive composition of claim 1 wherein the (B) reactive polydiorganosiloxane polymer:

(i) is a product of a hydrosilylation reaction of a $(C_2)$ alkenyl group-terminated polydiorganosiloxane having a dynamic viscosity at 25° C. from 10,000 cp to 150,000 cp; or (ii) is reactive polydiorganosiloxane polymer wherein at least 50%, at least 90%, or all of organo group of the is methyl; or (iii) is made using the compound of formula (I) in the hydrosilylation reaction wherein at least one, at least two, or all of $R^1$, $R^2$, and $R^3$ is methyl; or (iv) is a combination of (i) and (ii); (i) and (iii); (ii) and (iii); or (i), (ii), and (iii).

4. The condensation-curable electrically conductive silicone adhesive composition of claim 1 wherein the (C) particulate metal-based filler is such that:

(i) the metal of the (C) particulate metal-based filler is an element of any one of Groups 1 to 13 of the Periodic Table of the Elements, tin, lead, antimony, a lanthanide, an actinide, a blend of any two or more such metals, an alloy of any two or more such metals, or a core-shell particle comprising a shell composed of any one of such metals or such alloy and a core composed of a metallic or non-metallic support material; or (ii) the metal of the constituent (C) particulate metal-based filler is silver; copper; gold; aluminum; molybdenum; zinc; tungsten; nickel; iron; palladium; platinum; tin; lead; titanium; a metal alloy selected from bronze, brass 67Cu33Zn, carbon steel, grain oriented electrical steel, MANGANIN, constantin, or nichrome; or a blend of any two or more of the foregoing metals and alloys; or (iii) the (C) particulate metal-based filler is from 20 vol % to 50 vol % of the condensation-curable ECSA composition; or (iv) a combination of (i) and (ii); (i) and (iii); (ii) and (iii); or (i), (ii), and (iii).

5. The condensation-curable electrically conductive silicone adhesive composition of claim 1 further comprising at least one of constituents (D) to (I): (D) a condensation catalyst; (F) a crosslinker; (G) a moisture scavenger; (H) and adhesion promoter; (I) a non-reactive MQ organosiloxane resin having Mw from 3,000 to 10,000 g/mol; and (J) silica; wherein, when present, the amount of (H) is from >0 wt % to 70 wt % of the combined weight of (A)+(I).

6. The condensation-curable electrically conductive silicone adhesive composition of claim 1 wherein (i) the concentration of the constituent (A) is 45 wt % to 65 wt % based on total weight of constituents (A) and (B);

(ii) the concentration of constituent (C) is from 20 wt % to 60 wt % based on total weight of the condensation-curable electrically conductive silicone adhesive composition;

(iii) the condensation-curable ECSA composition is characterized by a bulk volume resistivity (ρ) of from >0 ohm-centimeter to <10 ohm-centimeters; or (iv) a combination of (i) and (ii), or (i) and (iii), or (ii) and (iii), or (i), (ii), and (iii).

7. A manufactured article comprising a physically-shaped form of the condensation-curable electrically conductive silicone adhesive composition of claim 1 the cured product thereof.

8. The manufacture article of claim 7, wherein the manufactured article is an electrical device comprising a substrate and the condensation-curable electrically conductive silicone adhesive composition of claim 1 or the cured product thereof, disposed on the substrate.

9. A method of making the condensation-curable electrically conductive silicone adhesive composition of claim 1, the method comprising mixing constituents comprising constituents (A) and (B), and a (E) vehicle solvent present at a concentration of 0.1 to 90 wt % based on total weigth of the composition, to give a homogeneous mixture of (A) and (B) and (E); dispersing constituent (C) into the homogeneous mixture to give a filled mixture; and dispersing a (D) condensation catalyst, and optionally (F) crosslinker and/or (G) moisture scavenger, into the filled mixture to give the condensation-curable electrically conductive silicone adhesive composition.

10. The condensation-curable electrically conductive silicone adhesive composition of claim 1, wherein, when cured, has:

(i) a volume resistivity (VR) of from 0.0001 to 0.1 Ohm-cm; or (ii) a bead flow of NS; or (iii) a durometer measurement of from 30 to 90; or (iv) an elongation-at-break of from 10% to 400%; or (vi) a stress at 12.5% strain of from 300 to 2000 kPa; or (vii) a tensile strength of from 1000 to 2000 kPa; or (viii) a combination of any two of (i) through (vi).

* * * * *